United States Patent
Yadav et al.

(10) Patent No.: US 10,496,492 B2
(45) Date of Patent: Dec. 3, 2019

(54) VIRTUAL MACHINE BACKUP WITH EFFICIENT CHECKPOINT HANDLING BASED ON A CONSISTENT STATE OF THE VIRTUAL MACHINE OF HISTORY DATA AND A BACKUP TYPE OF A CURRENT CONSISTENT STATE OF THE VIRTUAL MACHINE

(71) Applicant: EMC IP Holding Company LLC, Hopkinton, MA (US)

(72) Inventors: Sunil Yadav, Bangalore (IN); Suman Tokuri, Bangalore (IN); Soumen Acharya, Bangalore (IN); Pradeep Anappa, Bangalore (IN); Sudha Hebsur, Bangalore (IN); Aaditya Bansal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/887,324

(22) Filed: Feb. 2, 2018

(65) Prior Publication Data
US 2019/0243719 A1    Aug. 8, 2019

(51) Int. Cl.
G06F 11/14    (2006.01)
G06F 9/455    (2018.01)

(52) U.S. Cl.
CPC ...... *G06F 11/1458* (2013.01); *G06F 9/45558* (2013.01); *G06F 11/1448* (2013.01); *G06F 2009/45562* (2013.01); *G06F 2009/45583* (2013.01); *G06F 2009/45587* (2013.01)

(58) Field of Classification Search
CPC ............. G06F 11/1458; G06F 9/45558; G06F 11/1448; G06F 2009/45562; G06F 2009/45583; G06F 2009/45587
USPC ........................ 711/161, 162, 6; 714/4.11, 13
See application file for complete search history.

(56) References Cited

U.S. PATENT DOCUMENTS

| | | | |
|---|---|---|---|
| 9,436,596 B2* | 9/2016 | Sengupta | G06F 12/0866 |
| 2011/0072430 A1* | 3/2011 | Mani | G06F 1/30 718/1 |
| 2012/0191908 A1* | 7/2012 | North | G06F 11/2046 711/112 |
| 2013/0290781 A1* | 10/2013 | Chen | G06F 11/1438 714/19 |
| 2016/0210197 A1* | 7/2016 | Guthrie | G06F 11/1451 |
| 2017/0116088 A1* | 4/2017 | Anami | G06F 9/455 |

(Continued)

*Primary Examiner* — Hong C Kim
(74) *Attorney, Agent, or Firm* — Womble Bond Dickinson (US) LLP

(57) ABSTRACT

According to one embodiment, a system in response to a request to back up a virtual machine (VM) to a backup storage system, retrieves history data from the backup storage system. The history data has been previously backed up in the backup storage system during a previous backup operation of the VM. The history data includes a change tracking identifier (ID) associated with a consistent state of a VM disk attached to the VM at the point-in-time of the previous backup operation. The system validates the history data against a current configuration of the VM. The current configuration includes information of one or more current consistent states of the VM disk. The system determines a backup type for each of the current consistent states based on the validated history data. The system backs up each of the current consistent states based on the backup type.

20 Claims, 8 Drawing Sheets

(56) References Cited

U.S. PATENT DOCUMENTS

| | | | |
|---|---|---|---|
| 2017/0242764 A1* | 8/2017 | Antony | G06F 11/2007 |
| 2017/0249217 A1* | 8/2017 | Derk | G06F 11/1469 |
| 2017/0262299 A1* | 9/2017 | Chow | G06F 9/455 |
| 2017/0316030 A1* | 11/2017 | Shetty | G06F 9/45558 |
| 2018/0253361 A1* | 9/2018 | Dhatrak | G06F 11/1469 |

* cited by examiner

VIRTUAL MACHINE BACKUP WITH EFFICIENT CHECKPOINT HANDLING BASED ON A CONSISTENT STATE OF THE VIRTUAL MACHINE OF HISTORY DATA AND A BACKUP TYPE OF A CURRENT CONSISTENT STATE OF THE VIRTUAL MACHINE

FIELD OF THE INVENTION

Embodiments of the present invention relate generally to data storage systems. More particularly, embodiments of the invention relate to virtual machine (VM) backup with efficient checkpoint handling.

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). Today, many virtualization platforms (e.g., Microsoft Hyper-V Server) allow a user to create a point-in-time snapshot or saved state (also referred to as checkpoint) of a VM at any stage. Such checkpoint can subsequently be applied to revert to a previous state of the VM, thereby allowing a user to undo any catastrophic changes to the environment and reverting to a stable machine state when the checkpoint was created.

Unfortunately, handling of checkpoints in a backup process generally requires many steps to achieve consistency at all stages and maintain a valid disk chain. At the same time, presence of checkpoints in a target VM creates data overheads that can increase the processing time of a backup operation.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
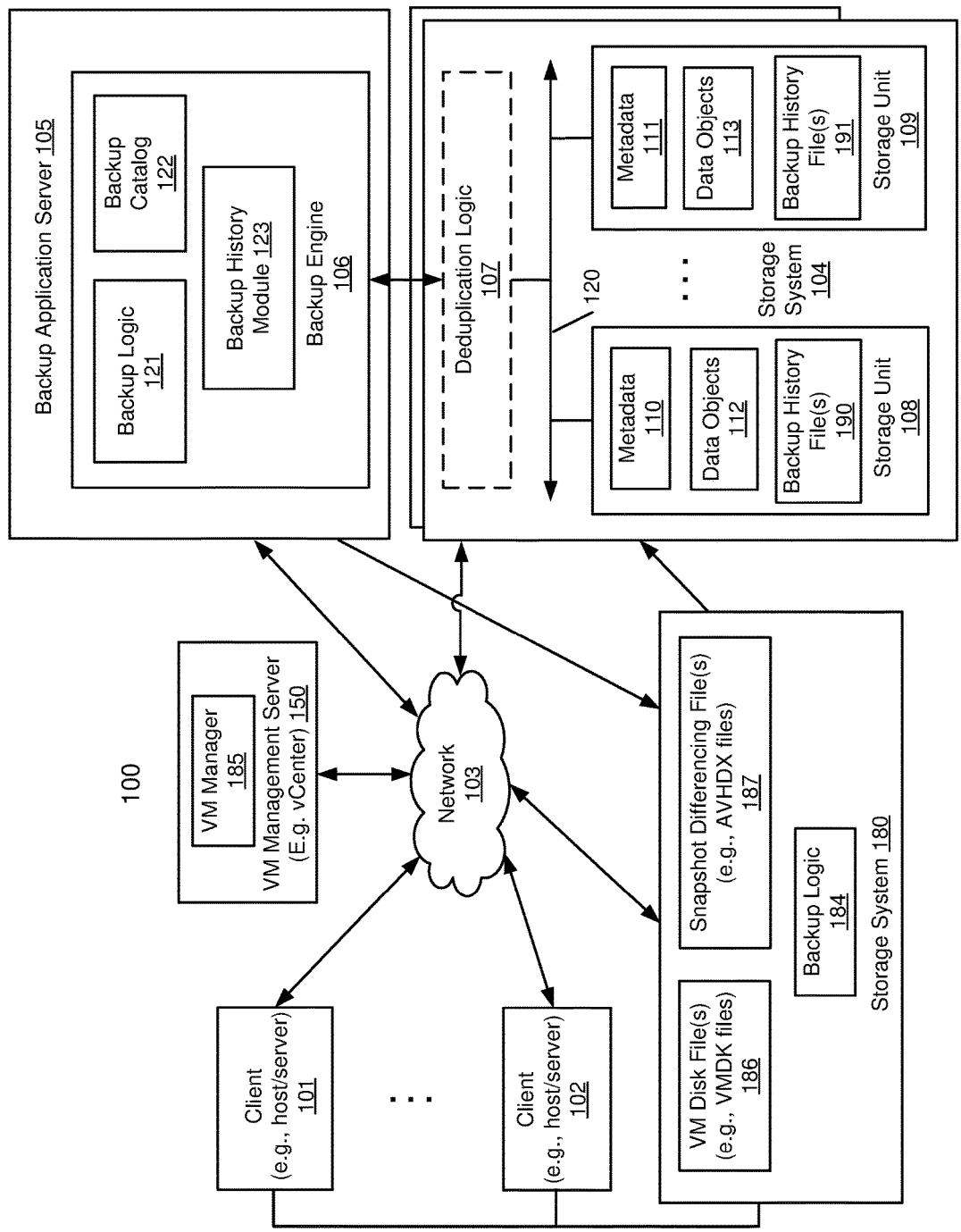
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a system in response to a request to back up a virtual machine (VM) to a backup storage system, retrieves history data from the backup storage system. The history data has been previously backed up in the backup storage system during a previous backup operation of the VM. The history data includes a change tracking identifier (ID) associated with a consistent state of a VM disk attached to the VM at the point-in-time of the previous backup operation. The system validates the history data against a current configuration of the VM. The current configuration includes information of one or more current consistent states of the VM disk. The system determines a backup type for each of the current consistent states based on the validated history data. The system backs up each of the current consistent states based on the backup type.

In one embodiment, in determining a backup type for each of the current consistent states, the system determines whether the change tracking ID within the history data is associated with the current consistent state. The system determines that the backup type is an incremental backup in response to determining that the change tracking ID is associated with the current consistent state. Otherwise, the system determines that the backup type is a full backup in response to determining that the change tracking ID is not associated with the current consistent state.

In one embodiment, in backing up each of the current consistent states, the system uses the change tracking ID to query change-tracking data associated with the current consistent state in response to determining that the tracking ID is associated with the current consistent state. The system stores the change-tracking data on the backup storage system. In one embodiment, in validating the history data against a current configuration of the VM, the system identifies a new VM disk is attached to the VM. The system further performs a full backup of the new VM disk onto the backup storage system. In one embodiment, the system further communicates merge information to the backup storage system to merge backup data from a deleted intervening consistent state with its parent backup.

FIG. 1 is a block diagram illustrating a storage system according to one embodiment. Referring to FIG. 1, system 100 includes, but is not limited to, one or more client systems 101-102 communicatively coupled to storage system 104, backup application server 105, VM Management server 150 (also referred to as virtual center or vCenter), and storage system 180 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as backup storage system 104. Network 103 may be any type of networks such as a local area network (LAN), a wide area network (WAN) such as the Internet, a fiber network, a storage network, or a combination thereof, wired or wireless.

Backup storage system 104 may include or represent any type of servers or a cluster of one or more servers (e.g., cloud servers). For example, backup storage system 104 may be a storage server used for various different purposes, such as to provide multiple users or client systems with access to shared data and/or to back up (or restore) data (e.g., mission critical data). Backup storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Backup storage system 104 may further provide storage services via an object-based protocol and Hadoop distributed file system (HDFS) protocol.

In one embodiment, backup application server 105 includes, but is not limited to, backup engine 106 which contains a backup catalog 122, backup logic 121, and backup history module (or logic) 123. Backup application server 105 coordinates with backup storage system 104, storage system 180, and clients 101-102 to run various backup operations. Backup logic 121 includes backup logic configured to receive and back up data from a client (e.g., clients 101-102) and to store the backup data in any one or more of storage units 108-109, and restore logic configured to retrieve and restore backup data from any one or more of storage units 108-109 back to a client (e.g., clients 101-102).

In one embodiment, VM Management server 150 includes, but is not limited to, VM Manager 185. VM Management server 150 manages VM configuration information of client 101 and/or client 102. A VM Management server may manage VM configuration information of multiple clients, and each client contains one or more VMs managed by a virtual machine monitor (VMM) running therein. A VM Management server may be communicatively coupled with clients, backup application server, and backup storage systems. VM Management server 150 may obtain VM information through various ways. For example, VM Management server 150 may remotely synchronize with VMMs within the network, or VMMs may update VM Management server 150 whenever status change happens with VMs. In this example, VM Management server 150 is communicatively coupled with backup application server 105 and clients 101 and 102.

Figure 2:
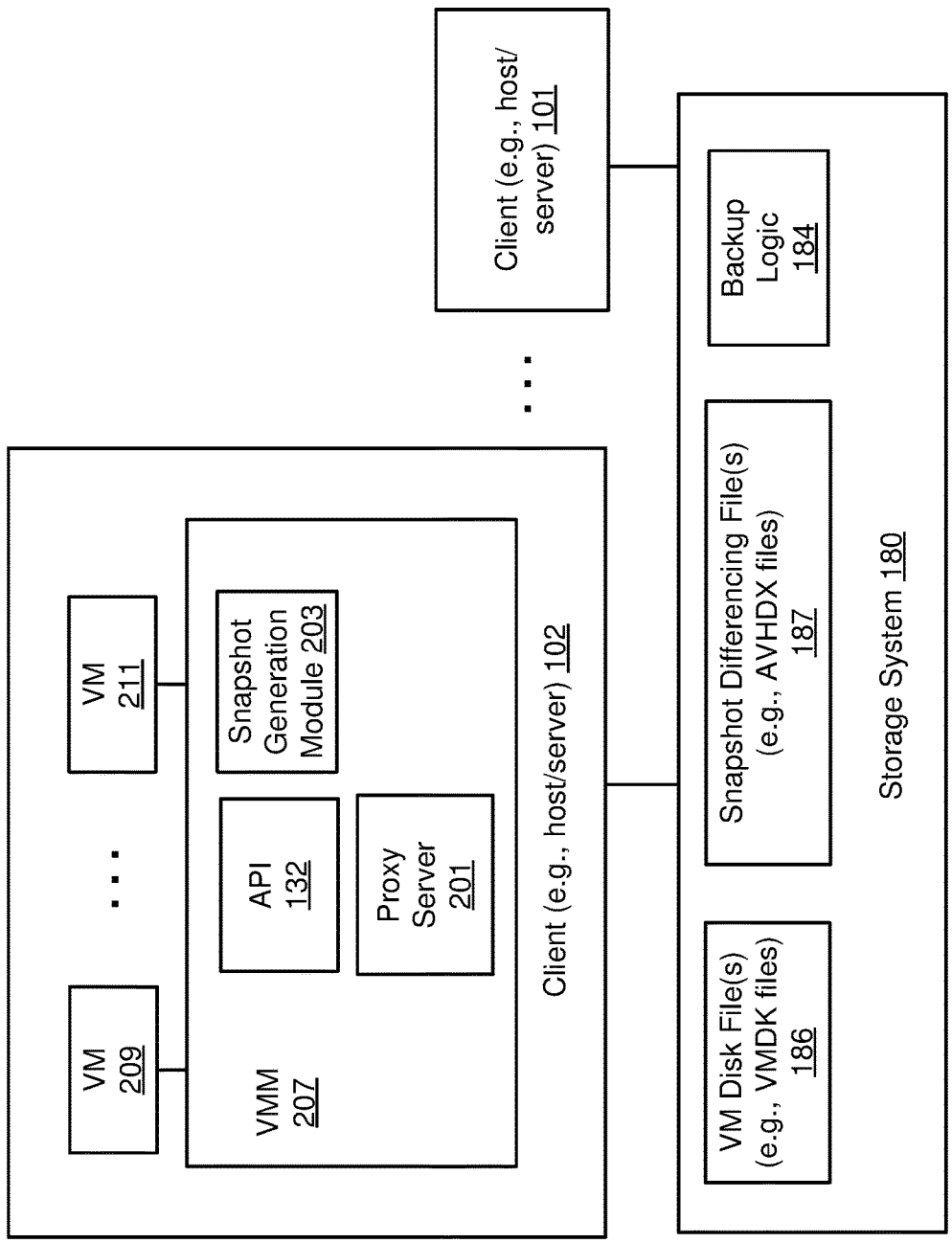
FIG. 2 is a block diagram illustrating clients and a storage system according to one embodiment.

A user operating VM Management server 150 can initiate a request to backup with a VM identifier (indicating VM 209 of FIG. 2 in this example). VM Management server 150 identifies that client 102 manages VMM 207, which hosts VM 209. VM Management server 150 requests VMM 207 to establish a consistent state (also referred to as snapshot or checkpoint) of VM 209. Client 102 is communicatively coupled with storage system 180. The snapshot could be one of a VM disk file 186 and/or one of a snapshot differencing file 187 of storage system 180. In one embodiment, VM Management server 150 and backup application server 105 may be integrated as a single system.

In one embodiment, backup storage system 104 includes, but is not limited to, deduplication logic 107, and one or more storage units or devices 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network. Note that in one embodiment, backup application server 105 and backup storage system 104 are integrated into one single system.

In response to a data file to be stored in storage units 108-109, optionally deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the backup storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup deduplicated data from client systems 101-102 and to store the data in one or more of storage units 108-109 of backup storage system 104 as data objects 112-113. In this example, a user initiates a backup request of a VM, such as VM 209 within client 102 (as shown in FIG. 2). VMM 207 generates a snapshot of VM 209. Client 102 is communicatively coupled with storage system 180. The snapshot could be one of a VM disk file 186 and/or one of a snapshot differencing file 187 of storage system 180.

As shown in FIG. 2, the to-be-backed-up VM 209, for example, resides on client 102. Client 102 includes one or more VMs 209-211 hosted by VMM 207. VMM 207 also includes an application programming interface (API) 132, through which VMM 207 manages VMs 209-211. In one embodiment, the API is a VM API such as VMware's vStorage APIs for Data Protection (VADP). In one embodiment, a user requests the backup from backup application server 105. In another embodiment, a user requests the backup from storage system 180. In another embodiment, a user requests the backup from VM Management server 150.

In response to the user request, backup history module 123 may create one or more backup history files 190-191 and store them along with backup data of VM 209 (i.e., metadata 110-111 and data objects 112-113) during each backup operation. Backup history file(s) 190-191 may include information pertaining to one or more disks (e.g., top disk and associated snapshots) in their respective disk chains, which may be represented or described by VM disk file(s) 186 and snapshot differencing file(s) 187, for VM 209. During a subsequent backup operation, backup history module 123 may obtain history data from the backup history file(s) 190-191 that are associated with the previous successful backup operation. Such history data may include disk information (or configuration) and checkpoint information (or configuration) associated with one or more disks in their respective disk chains. Backup history module 123 thereafter may validate the history data against the current configuration of VM 209 to identify discrepancies (if any) within each of the disk chains of VM 209 (with respect to the previous backed up version). Based on this information, backup history module 123 may effectively assign a backup type (e.g., full or incremental) for each disk or snapshot associated with VM 209 during a backup operation. Accordingly, if an incremental backup is assigned for a particular disk or snapshot of the disk, then only new (or incremental) data are backed up and stored in storage system 104. Otherwise, if a full backup is assigned then the entire content of the disk or snapshot is backed up and stored in storage system 104. This granularity of selecting a backup level aids in minimizing the processing requirements and reduces the overall backup window for a target VM (e.g., VM 209), thereby creating a time and data efficient backup for the target VM.

In some embodiments, an identifier (ID) may be generated and stored in backup history files 190-191 as part of history data. For example, in the case of VM backups with resilient change tracking (RCT), an RCT ID corresponding to the top disk in each disk chain may be generated during the backup process for a target VM. RCT refers to a feature that provides built-in change block tracking capability for VM disks (e.g., Hyper-V VM disks). The RCT ID, for example, may be obtained from the history data to query change-tracking information (or data) of a particular disk since the previous backup operation to determine whether data has changed. If there are changes, the incremental data may be streamed to storage system 104 where the incremental data are merged with existing data on storage system 104 for the target VM. During this incremental backup, a new RCT ID may be generated and saved in backup history file(s) 190-191 to track new change-tracking information of the disk that begins from the point-in-time of the current backup operation.

Storage system 180 may include any type of server or cluster of servers. For example, storage system 180 may be a storage server used for any of various different purposes, such as to provide multiple users with access to shared data and/or to back up mission critical data. Storage system 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Storage system 180 may have a distributed architecture, or all of its components may be integrated into a single unit. Storage system 180 may be implemented as part of a storage system available from EMC® Corporation of Hopkinton, Mass.

Storage system 180 contains backup logic 184 that manages both backup and restore processes within the storage system. Storage system 180 also contains VM disk files 186 that are the content files of the VMs. Storage system 180 further contains snapshot differencing files 187 that are disk image checkpoints, which bootstrap VMs (e.g., VMs 209-211) using disk images. Each snapshot differencing file contains a point in time, which is used to make up a timeline with other snapshot differencing files in the chain. These snapshot differencing files enable a VM to revert to a previous state, which may allow a user to create a specific condition for troubleshooting a problem. In one embodiment, each of the snapshots differencing files 187 may include the state, data, and hardware configuration of a VM (e.g., VMs 209-211) at the time of the file creation. Note that a storage system of a client may also be called the primary storage of the client to distinguish the storage from backup storage systems.

A virtual machine represents a completely isolated operating environment with a dedicated set of virtual resources associated with it. A virtual machine may be installed or launched as a guest operating system (OS) hosted by a host OS or a hypervisor. Typically, a host OS or hypervisor represents a VMM for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources. Here VMM 207 manages both VM 209 and VM 211.

In one embodiment, via API 132 of FIG. 2, backup engine 106 collects attributes associated with the VM being backed up (e.g. CPU, memory, disk configuration) and stores the VM attributes in backup catalog 122. The attributes are subsequently used to provision a new VM to be the target of restoration.

FIG. 2 is a block diagram illustrating clients and a storage system according to one embodiment. Referring to FIG. 2, VMM 207 includes, but is not limited to, API 132, proxy server 201, and snapshot generation module 203. API 132 allows any external system to communicate with VMM 207. For example, backup application server 105 can send request to VMM 207 via API 132 to initiate a backup operation. In another example, backup application server 105 can establish a consistent state of a VM stored on client 102 and to request for a backup catalog of the VM via API 132. Proxy server 201 can let VMM 207 mount any VMs hosted on the client and to access files of the VMs. Snapshot generation module 203 can establish consistent states of VMs on the client. For example, backup application server 105 may send a backup request for VM 209 to VMM 207 via API 132. Snapshot generation module 203 of VMM 207 thereafter establishes a consistent state, or a snapshot, for VM 209. The snapshot may be one of VM disk files (or VMDK files 186) and/or one of snapshot differencing files (or AVHDX files 187). Proxy server 201 mounts the snapshot to allow file access to the snapshot.

Figure 3:
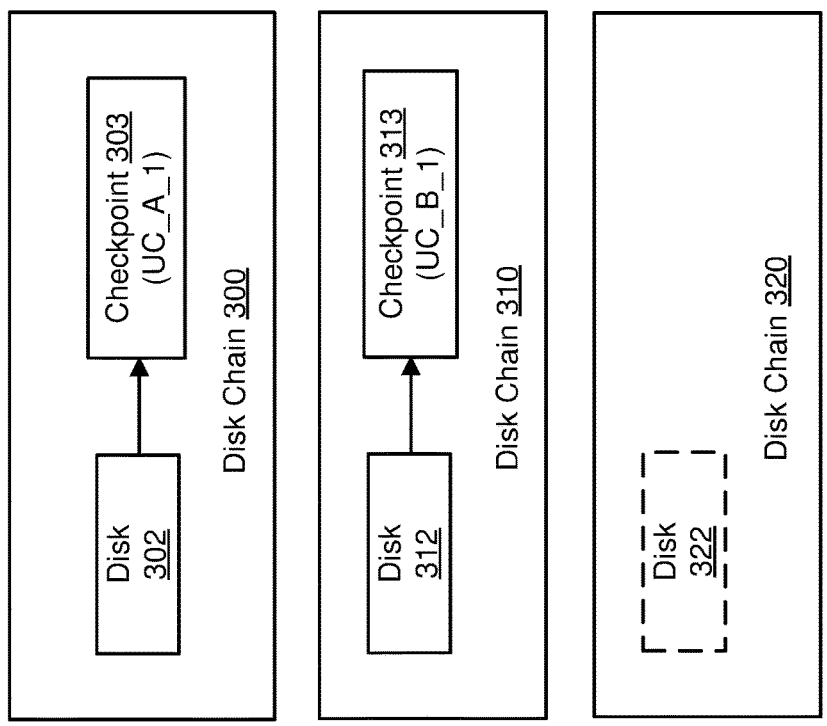
FIG. 3 is a block diagram illustrating different disk chains and creation of a new disk according to one embodiment.

FIG. 3 is a block diagram illustrating different disk chains and creation of a new disk according to one embodiment. Referring to FIG. 3, a VM (e.g., VM 209) may initially include VM disk 302 and VM disk 312 respectively within VM disk chain 300 and VM disk chain 310. As shown, at a particular point-in-time, checkpoint (or snapshot) 303 and checkpoint 313 are respectively created for disk 302 and disk 312, with disk 302 pointing to checkpoint 303 and disk 312 pointing to checkpoint 313. As such, an RCT ID for each checkpoint is generated to provide change-tracking information for the respective disk (i.e., disk 302 or disk 312). For example, the RCT ID assigned to checkpoint 303 may be referred to as "UC_A_1" and RCT ID assigned to checkpoint 313 may be referred to as "UC_B_1". In this example, a backup operation has previously been performed on the VM. Backup data of disks 302 and 312 therefore have been stored on a storage system (e.g., storage system 104). UC_A_1 and UC_B_1, disk information (or configuration), and checkpoint information (or configuration) associated with disks 302 and 312 have also been stored in a backup history file (e.g., backup history file 190 or 191) as history data.

As shown in FIG. 3, prior to a next backup operation, a new VM disk 322 within VM disk chain 320 may be added to the VM. During the next backup operation, history data may be obtained and validated against the VM's current configuration. In this scenario, there is no information pertaining to disk 322 in the history data. As such, disk 322 may be treated as new or fresh data and a full backup may be initiated for disk 322. With respect to disks 302 and 312, history data may be used to validate (or compare) against the VM's current configuration (e.g., resources allocated to the VM that may include allocated processors, memory, disks, network adapters, and/or user interface) to assign a backup type (e.g., full or incremental) for disks 302 and 312. For example, UC_A_1 and UC_B_1 may be used to query change-tracking information (i.e., incremental data) for disk 302 and disk 312, respectively. If there exists new or updated data, an incremental backup may be initiated for disks 302 and 312. Accordingly, in the example of FIG. 3, instead of initiating a full backup for the entire VM, only the newly added disk 322 is fully backed up. Incremental backups are performed for existing disks 302 and 312.

Figure 4:
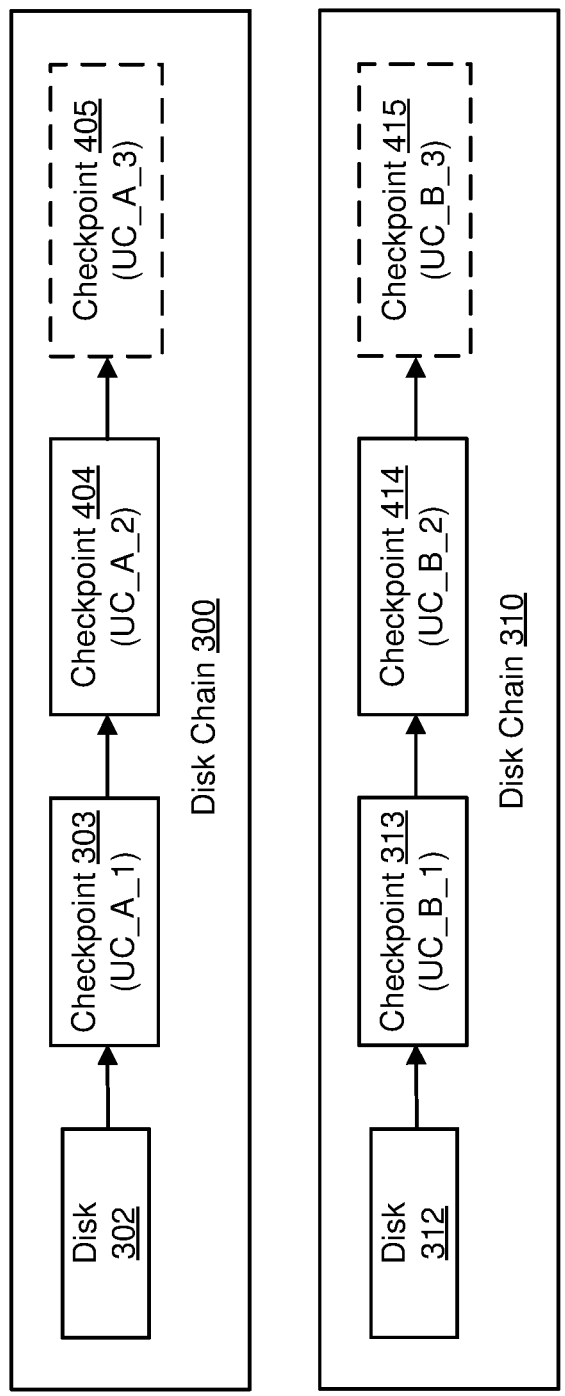
FIG. 4 is a block diagram illustrating different disk chains and creation of additional checkpoints according to one embodiment.

FIG. 4 is a block diagram illustrating different disk chains and creation of additional checkpoints according to one embodiment. Referring to FIG. 4, as previously described, a VM may initially include VM disk 302 and VM disk 312 respectively within VM disk chain 300 and VM disk chain 310. As shown, at a first point-in-time, checkpoint (or snapshot) 303 and checkpoint 313 are respectively created for disk 302 and disk 312, with disk 302 pointing to checkpoint 303 and disk 312 pointing to checkpoint 313. As such, an RCT ID (e.g., UC_A_1 and UC_B_1) for each checkpoint is generated to provide change-tracking information for the respective disk (i.e., disk 302 or disk 312). In FIG. 4, at a second point-in-time, checkpoint 404 and checkpoint 414 are respectively created for disk 302 and disk 312. Accordingly, RCT IDs "UC_A_2" and "UC_B_2" are respectively generated for checkpoint 404 and checkpoint 414. In this example, a backup operation has previously been performed on the target VM. Backup data of disks 302 and 312 therefore have been stored on a storage system (e.g., storage system 104). UC_A_2 and UC_B_2 (associated with latest checkpoints 404 and 414), disk information, and checkpoint information associated with disks 302 and 312 have also been stored in a backup history file (e.g., backup history file 190 or 191) as history data at this point.

With continued reference to FIG. 4, prior to a next backup operation, at a third point-in-time, checkpoints 405 and 415 may be created respectively in disk chains 300 and 310. This therefore extends disk chains 300 and 310 by adding RCT IDs "UC_A_3" and "UC_B_3" to the respective disk chains. During the next backup operation, when the history data is being validated, information pertaining to disk chains 300 and 301 are validated against the current configuration of the VM. In this scenario, during validation of each disk, checkpoints 405 and 415 are deemed "NOT_PRESENT" from the history data. Additionally, UC_A_3 and UC_B_3 do not point to top disks 302 and 312. Accordingly, in this scenario, checkpoints 405 and 415 are considered new data and a full backup is performed for each of the checkpoints 405 and 415. Moreover, incremental backup may be performed for each of checkpoints 404 and 414 based on the queried change-tracking information obtained using UC_A_2 and UC_B_2.

Figure 5:
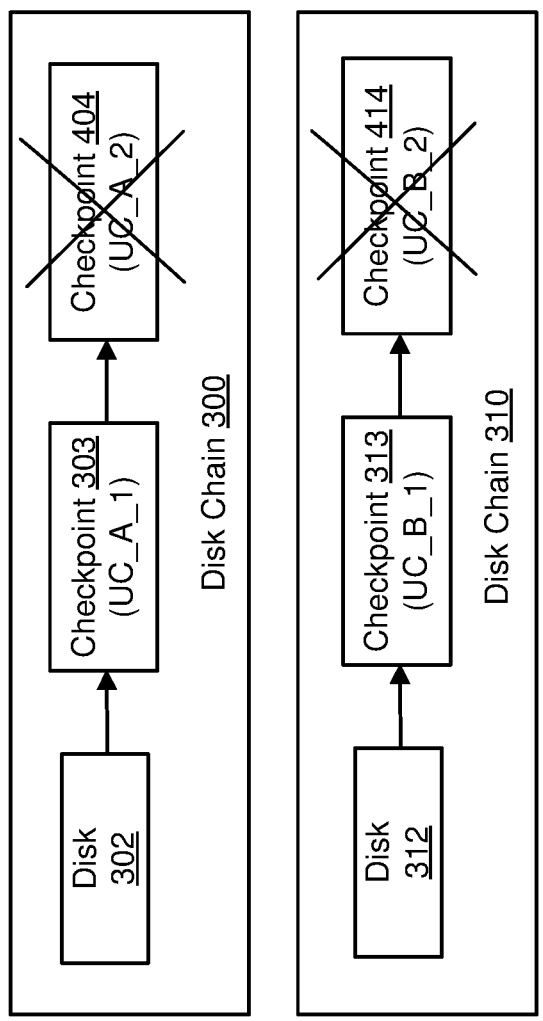
FIG. 5 is a block diagram illustrating different disk chains and deletion of checkpoints according to one embodiment.

FIG. 5 is a block diagram illustrating different disk chains and deletion of checkpoints according to one embodiment. Referring to FIG. 5, as previously described, a VM may initially include VM disk 302 and VM disk 312 respectively within VM disk chain 300 and VM disk chain 310. As shown, at a first point-in-time, checkpoint (or snapshot) 303 and checkpoint 313 are respectively created for disk 302 and disk 312, with disk 302 pointing to checkpoint 303 and disk 312 pointing to checkpoint 313. As such, an RCT ID (e.g., UC_A_1 and UC_B_1) for each checkpoint is generated to provide change-tracking information for the respective disk (i.e., disk 302 or disk 312). In FIG. 4, at a second point-in-time, checkpoint 404 and checkpoint 414 are respectively created for disk 302 and disk 312. Accordingly, RCT IDs "UC_A_2" and "UC_B_2" are respectively generated for checkpoint 404 and checkpoint 414. In this example, a backup operation has previously been performed on the target VM. Backup data of disks 302 and 312 therefore have been stored on a storage system (e.g., storage system 104). UC_A_2 and UC_B_2 (associated with latest checkpoints 404 and 414), disk information, and checkpoint information associated with disks 302 and 312 have also been stored in a backup history file (e.g., backup history file 190 or 191) as history data at this point.

With continued reference to FIG. 5, prior to a next backup operation, at a third point-in-time, checkpoints 404 and 414 may respectively be deleted from disk chains 300 and 310, and merged with checkpoints 303 and 313 (i.e., UC_A_1 and UC_B_1). This therefore shortens disk chains 300 and 310 by removing RCT IDs "UC_A_2" and "UC_B_2" from the respective disk chains. In addition, from the VM's environment, UC_A_2 and UC_B_2 created from the previous successful backup are now associated with UC_A_1 and UC_B_1. From the storage system's perspective, UC_A_1 and UC_B_1 are now associated with some of the data in deleted checkpoints 404 and 414 (i.e., UC_A_2 and UC_B_2) along with incremental data in checkpoints 404 and 414 (as compared to checkpoints 303 and 313). During the next backup operation, when the history data is being validated, information pertaining to disk chains 300 and 301 are validated against the current configuration of the VM. In this scenario, checkpoints 404 and 414 are deemed "NOT PRESENT" in the VM's current configuration. Also, the RCT IDs (e.g., UC_A_2 and UC_B_2) from the history data now point to different checkpoints as checkpoints 404 and 414 are deleted. Accordingly, in this case, only newly added information associated with UC_A_ and UC_B_1 are backed up. Therefore, instead of initiating a full backup for each of disk chains 300 and 310, only incremental data corresponding to the top checkpoints 303 and 313 are backed up.

Figure 6:
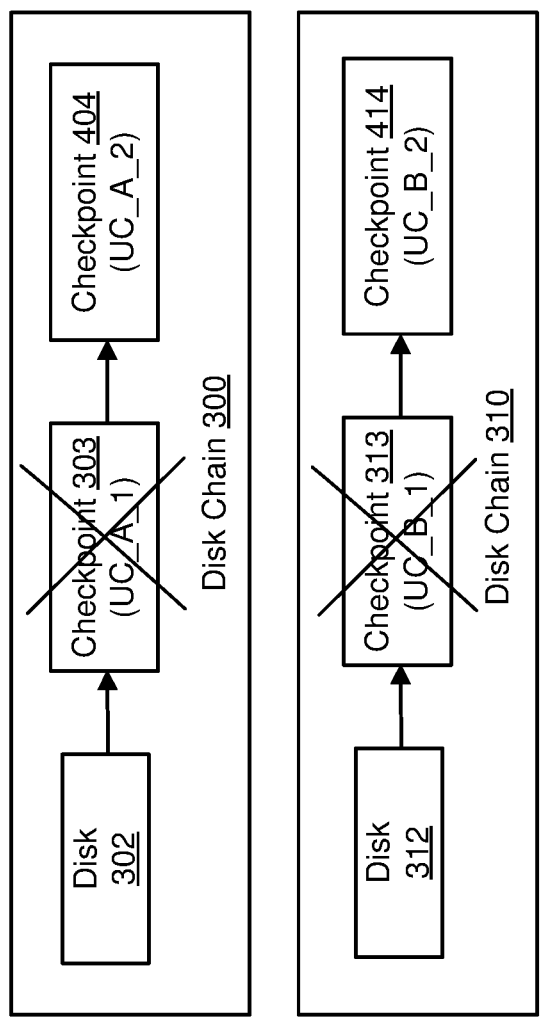
FIG. 6 is another block diagram illustrating deletion of checkpoints according to one embodiment.

FIG. 6 is another block diagram illustrating deletion of checkpoints according to one embodiment. FIG. 6 illustrates disk chains 300 and 310 that have been previously described with respect to FIG. 5, and for brevity sake, will not be described again. However, in FIG. 6, intervening checkpoints 303 and 313 are deleted prior to a next backup operation instead of checkpoints 404 and 414. In this scenario, from the VM's environment, the RCT IDs generated from the previous successful backup operation are still associated with UC_A_2 and UC_B_2. From the storage system's perspective, disk 302 and disk 312 now contain data that was previously associated with UC_A_1 and UC_B_1. During the next backup operation, when the history data is being validated, checkpoints 303 and 313 are found "NOT PRESENT" in the VM's current configuration. Accordingly, only data that has been added to the current top checkpoints 404 and 414 are backed up. This is the queried change-tracking data associated with UC_A_2 and UC_B_2 that was added since the previous successful backup operation. Data that was previously in deleted checkpoints 303 and 313 are respectively merged with disks 302 and 312. From the storage system's perspective, since the data already exists on the storage system, merge information pertaining to the data may be communicated to the storage system to merge the data with its immediate parent (both of which already exist on the storage system). Therefore, instead of initiating a full backup operation for disk chains 300 and 310 in the VM, only the incremental data corresponding to top checkpoints 404 and 414 are backed up along with merge information associated with the deleted checkpoints 303 and 313.

Figure 7:
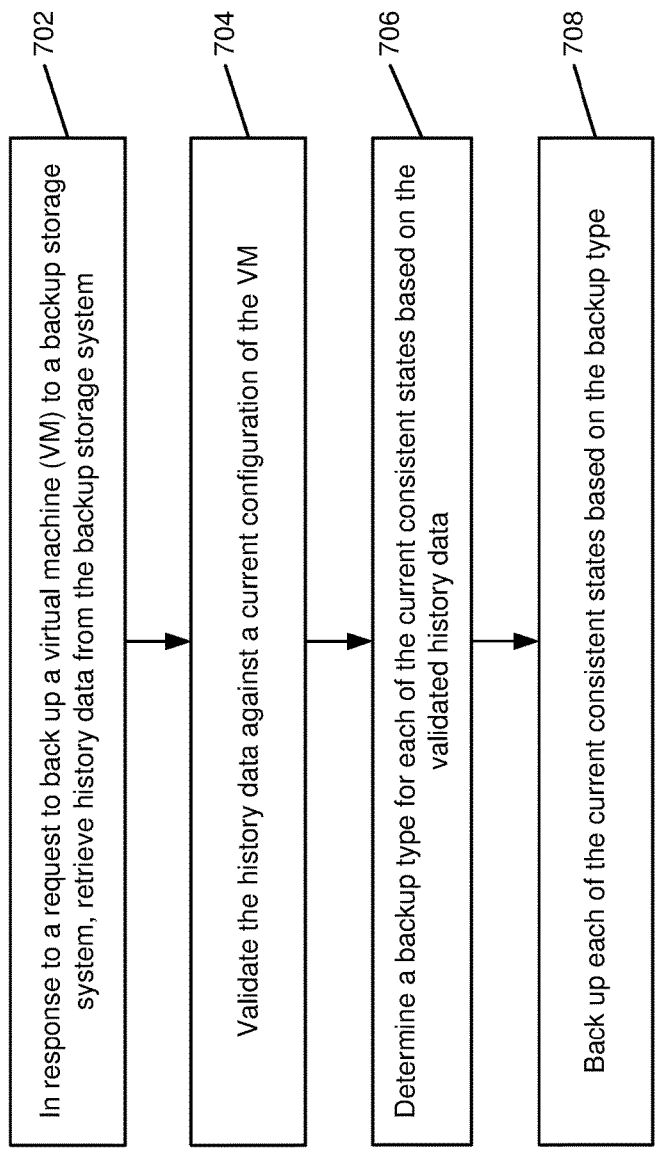
FIG. 7 is a flow diagram illustrating a data backup process according to one embodiment of the invention.

FIG. 7 is a flow diagram illustrating a data backup process according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by backup logic 121 and/or backup history module 123 of FIG. 1.

Referring to FIG. 7, at block 702, the processing logic in response to a request to back up a virtual machine (VM) to a backup storage system, retrieves history data from the backup storage system. In one embodiment, the history data has been previously backed up in the backup storage system during a previous backup operation of the VM. In one embodiment, the history data includes a change tracking identifier (ID) associated with a consistent state of a VM disk attached to the VM at the point-in-time of the previous backup operation. At block 704, the processing logic validates the history data against a current configuration of the VM. In one embodiment, the current configuration includes information of one or more current consistent states of the VM disk. At block 706, the processing logic determines a backup type for each of the current consistent states based on the validated history data. At block 708, processing logic backs up each of the current consistent states based on the backup type.

Note that some or all of the components as shown and described above (e.g., backup history module 123 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
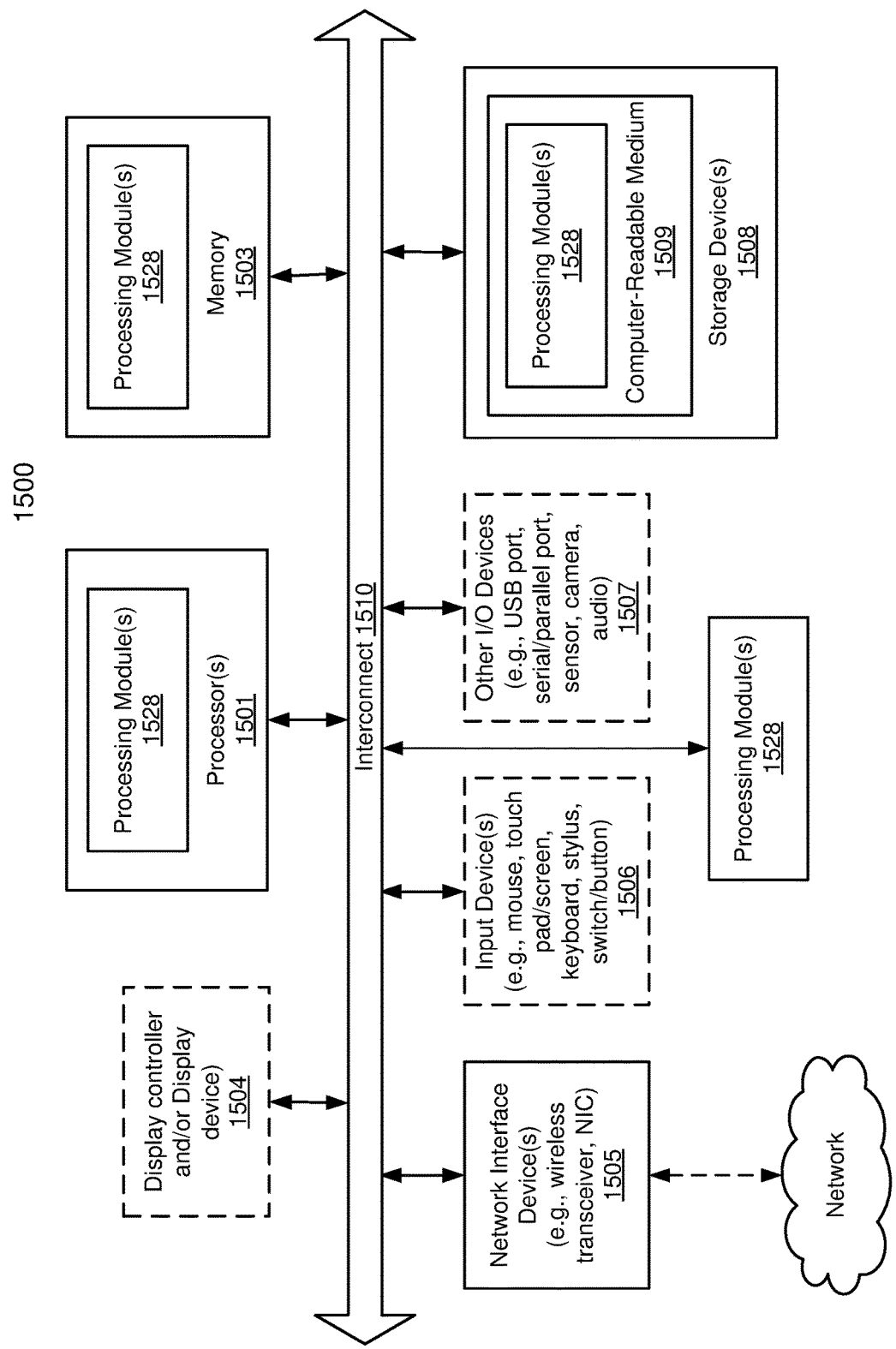
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems such as clients 101-102 and/or servers 104-106 and 150 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to back up virtual machines, the method comprising:
   in response to a request to back up a virtual machine (VM) to a backup storage system, retrieving history data from the backup storage system, wherein the history data has been previously backed up in the backup storage system during a previous backup operation of the VM, wherein the history data includes a change tracking identifier (ID) associated with a consistent state of a VM disk attached to the VM at a point-in-time of the previous backup operation;
   validating the history data against a current configuration of the VM, wherein the current configuration includes information of one or more current consistent states of the VM disk;
   determining a backup type for each of the current consistent states based on the validated history data; and
   backing up each of the current consistent states based on the backup type.

2. The method of claim 1, wherein determining a backup type for each of the current consistent states comprises:
   determining whether the change tracking ID within the history data is associated with the current consistent state,
   determining that the backup type is an incremental backup in response to determining that the change tracking ID is associated with the current consistent state, and
   otherwise, determining that the backup type is a full backup in response to determining that the change tracking ID is not associated with the current consistent state.

3. The method of claim 2, wherein backing up each of the current consistent states comprises:
   using the change tracking ID to query change-tracking data associated with the current consistent state in response to determining that the tracking ID is associated with the current consistent state, and
   storing the change-tracking data on the backup storage system.

4. The method of claim 1,
wherein validating the history data against a current configuration of the VM comprises identifying a new VM disk is attached to the VM, and
further comprising performing a full backup of the new VM disk onto the backup storage system.

5. The method of claim 1, wherein the backup type is an incremental backup or a full backup.

6. The method of claim 1, wherein the VM disk and the one or more current consistent states are within a disk chain.

7. The method of claim 2, further comprising:
communicating merge information to the backup storage system to merge backup data from a deleted intervening consistent state with its parent backup.

8. A non-transitory machine-readable medium having instructions stored therein, which when executed by a processor, cause the processor to perform operations, the operations comprising:
in response to a request to back up a virtual machine (VM) to a backup storage system, retrieving history data from the backup storage system, wherein the history data has been previously backed up in the backup storage system during a previous backup operation of the VM, wherein the history data includes a change tracking identifier (ID) associated with a consistent state of a VM disk attached to the VM at a point-in-time of the previous backup operation;
validating the history data against a current configuration of the VM, wherein the current configuration includes information of one or more current consistent states of the VM disk;
determining a backup type for each of the current consistent states based on the validated history data; and
backing up each of the current consistent states based on the backup type.

9. The non-transitory machine-readable medium of claim 8, wherein determining a backup type for each of the current consistent states comprises:
determining whether the change tracking ID within the history data is associated with the current consistent state,
determining that the backup type is an incremental backup in response to determining that the change tracking ID is associated with the current consistent state, and
otherwise, determining that the backup type is a full backup in response to determining that the change tracking ID is not associated with the current consistent state.

10. The non-transitory machine-readable medium of claim 9, wherein backing up each of the current consistent states comprises:
using the change tracking ID to query change-tracking data associated with the current consistent state in response to determining that the tracking ID is associated with the current consistent state, and
storing the change-tracking data on the backup storage system.

11. The non-transitory machine-readable medium of claim 8,
wherein validating the history data against a current configuration of the VM comprises identifying a new VM disk is attached to the VM, and
wherein the operations further comprise performing a full backup of the new VM disk onto the backup storage system.

12. The non-transitory machine-readable medium of claim 8, wherein the backup type is an incremental backup or a full backup.

13. The non-transitory machine-readable medium of claim 8, wherein the VM disk and the one or more current consistent states are within a disk chain.

14. The non-transitory machine-readable medium of claim 9, wherein the operations further comprise:
communicating merge information to the backup storage system to merge backup data from a deleted intervening consistent state with its parent backup.

15. A data processing system, comprising:
a processor; and
a memory coupled to the processor to store instructions, which when executed by the processor, cause the processor to perform operations, the operations including:
in response to a request to back up a virtual machine (VM) to a backup storage system, retrieving history data from the backup storage system, wherein the history data has been previously backed up in the backup storage system during a previous backup operation of the VM, wherein the history data includes a change tracking identifier (ID) associated with a consistent state of a VM disk attached to the VM at a point-in-time of the previous backup operation;
validating the history data against a current configuration of the VM, wherein the current configuration includes information of one or more current consistent states of the VM disk;
determining a backup type for each of the current consistent states based on the validated history data; and
backing up each of the current consistent states based on the backup type.

16. The data processing system of claim 15, wherein determining a backup type for each of the current consistent states comprises:
determining whether the change tracking ID within the history data is associated with the current consistent state,
determining that the backup type is an incremental backup in response to determining that the change tracking ID is associated with the current consistent state, and
otherwise, determining that the backup type is a full backup in response to determining that the change tracking ID is not associated with the current consistent state.

17. The data processing system of claim 16, wherein backing up each of the current consistent states comprises:
using the change tracking ID to query change-tracking data associated with the current consistent state in response to determining that the tracking ID is associated with the current consistent state, and
storing the change-tracking data on the backup storage system.

18. The data processing system of claim 15,
wherein validating the history data against a current configuration of the VM comprises identifying a new VM disk is attached to the VM, and
wherein the operations further include performing a full backup of the new VM disk onto the backup storage system.

19. The data processing system of claim 15, wherein the VM disk and the one or more current consistent states are within a disk chain.

20. The data processing system of claim 16, wherein the operations further include:

communicating merge information to the backup storage system to merge backup data from a deleted intervening consistent state with its parent backup.

* * * * *